(12) United States Patent
Li et al.

(10) Patent No.: US 10,463,965 B2
(45) Date of Patent: Nov. 5, 2019

(54) CONTROL METHOD OF SCENE SOUND EFFECT AND RELATED PRODUCTS

(71) Applicant: GUANGDONG OPPO MOBILE TELECOMMUNICATIONS CORP., LTD., Dongguan, Guangdong (CN)

(72) Inventors: Yajun Li, Dongguan (CN); Gaoting Gan, Dongguan (CN); Guang Tu, Dongguan (CN); Hai Yang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/095,124

(22) PCT Filed: Jun. 8, 2017

(86) PCT No.: PCT/CN2017/087579
§ 371 (c)(1),
(2) Date: Oct. 19, 2018

(87) PCT Pub. No.: WO2017/215511
PCT Pub. Date: Dec. 21, 2017

(65) Prior Publication Data
US 2019/0143214 A1 May 16, 2019

(30) Foreign Application Priority Data
Jun. 16, 2016 (CN) .......................... 2016 1 0429174

(51) Int. Cl.
*A63F 13/54* (2014.01)
*G06F 16/953* (2019.01)
(Continued)

(52) U.S. Cl.
CPC .............. *A63F 13/54* (2014.09); *G06F 16/61* (2019.01); *G06F 16/953* (2019.01); *H04L 67/38* (2013.01); *H04L 67/42* (2013.01)

(58) Field of Classification Search
CPC ........ A63F 13/54; G06F 16/953; G06F 16/61; H04L 67/38; H04L 67/42
See application file for complete search history.

(56) References Cited

U.S. PATENT DOCUMENTS 5,754,660 A * 5/1998 Shimizu .................. A63F 13/02
381/17
5,993,318 A * 11/1999 Kousaki .................. A63F 13/10
463/35

(Continued)

FOREIGN PATENT DOCUMENTS

| CN | 103617797 A | 3/2014 |
| CN | 103778197 A | 5/2014 |

(Continued)

OTHER PUBLICATIONS

International Search Report in international application No. PCT/CN2017/087579, dated Aug. 30, 2017.
(Continued)

*Primary Examiner* — Corbett B Coburn
(74) *Attorney, Agent, or Firm* — Ladas & Parry LLP (57) ABSTRACT

Embodiments of the present invention disclose a control method of a scene sound effect and related products. The method comprises: when turned on, an electrical device starts a service with a monitoring function; the electronic device monitors a newly created view in the electronic device by means of the service with the monitoring function to determine whether a view is newly created in the electronic device or not, the characteristic of the newly created view having a mapping relationship with an application in the electronic device; if yes, the electronic device determines
(Continued)

the application that has the mapping relationship with the characteristic of the newly created view in the electronic device according to the mapping relationship; the electronic device obtains a scene sound effect corresponding to the application, and sets the current sound effect of the electronic device as the scene sound effect. The scene sound effect is not set manually during the process. On the premise of ensuring a higher accuracy of the scene sound effect, the operation is simplified, and the service efficiency of the electronic device is improved.

18 Claims, 4 Drawing Sheets

(51) Int. Cl.
    *G06F 16/61*     (2019.01)
    *H04L 29/06*     (2006.01)

(56) References Cited

U.S. PATENT DOCUMENTS

| | | | |
|---|---|---|---|
| 9,876,836 B1* | 1/2018 | Van Gorden | H04L 65/4084 |
| 2002/0082080 A1* | 6/2002 | Kojima | A63F 13/10 463/31 |
| 2005/0042591 A1* | 2/2005 | Bloom | G11B 27/034 434/307 A |
| 2005/0201565 A1* | 9/2005 | Choi | G06F 3/167 381/61 |
| 2009/0247298 A1* | 10/2009 | Tokuhara | A63F 13/10 463/35 |
| 2010/0255906 A1* | 10/2010 | Chen | A63F 13/10 463/31 |
| 2014/0235347 A1* | 8/2014 | Zhang | A63F 13/00 463/35 |
| 2015/0113408 A1* | 4/2015 | Eppolito | G06F 3/167 715/726 |
| 2016/0066119 A1* | 3/2016 | Wu | H04S 7/30 381/303 |
| 2016/0317929 A1* | 11/2016 | Wu | A63F 13/55 |
| 2018/0256970 A1 | 9/2018 | Zhang | |

FOREIGN PATENT DOCUMENTS

| | | |
|---|---|---|
| CN | 103945088 A | 7/2014 |
| CN | 103970526 A | 8/2014 |
| CN | 104090766 A | 10/2014 |
| CN | 104375799 A | 2/2015 |
| CN | 105468388 A | 4/2016 |
| CN | 105959481 A | 9/2016 |
| KR | 20110009950 A | 1/2011 |
| WO | 2014101637 A1 | 7/2014 |

OTHER PUBLICATIONS

Written Opinion of the International Search Authority in international application No. PCT/CN2017/087579, dated Aug. 30, 2017.
Supplementary European Search Report in European application No. 17812622.3, dated Dec. 7, 2018.
English Translation of the Written Opinion of the International Search Authority in international application No. PCT/CN2017/087579, dated Aug. 30, 2017.

* cited by examiner

CONTROL METHOD OF SCENE SOUND EFFECT AND RELATED PRODUCTS

RELATED APPLICATION

This application is an application under 35 U.S.C. 371 of International Application No. PCT/CN2017/087579 filed on Jun. 8, 2017, the entire contents of which are incorporated herein by reference.

CROSS-REFERENCE TO RELATED APPLICATIONS

The present application claims priority of China Patent Application No. 201610429174.9, filed on Jun. 16, 2016, the contents of which are hereby incorporated by reference in its entirety.

TECHNICAL FIELD

The disclosure relates to the technical field of computers, and more particularly to a method for controlling a scene sound effect and a related product.

BACKGROUND

A sound effect is an effect achieved by a sound and refers to a noise or sound added to enhance the sense of reality, atmosphere or dramatic information of a certain scene. The added noise or sound may include a musical sound and an effect sound, for example, a digital sound effect, an environmental sound effect and a Moving Picture Experts Group Audio Layer-3 (MP3) sound effect (ordinary sound effect and professional sound effect).

Accordingly, sound effects, sometimes also called audio effects, are artificial or enhanced sounds adopted to enhance sound processing for movies, electronic games, music or arts of other media or other contents. A scene sound effect is a sound effect applied for more specific application scene, involving a sound effect related to the current application scene.

Therefore, adoption of different sound processing technologies for different scenes may achieve different sound effects. Thus, an auditory experience of a user may be greatly improved by increasing a recognition rate of an application scene and setting a corresponding sound effect mode.

SUMMARY

According to a first aspect, embodiments of the disclosure provide a method for controlling a scene sound effect. After electronic equipment is turned on, a monitoring service is enabled. The electronic equipment monitors a newly created view in the electronic equipment by means of the monitoring service to determine whether there is the newly created view in the electronic equipment or not, a characteristic of the newly created view having a mapping relationship with an application in the electronic equipment. If the electronic equipment determines that there is the newly created view in the electronic equipment, the application having the mapping relationship with the characteristic of the newly created view in the electronic equipment is determined according to the mapping relationship. The electronic equipment acquires a scene sound effect corresponding to the application and sets a current sound effect of the electronic equipment as the scene sound effect.

According to a second aspect, the embodiments of the disclosure provide electronic equipment, which includes a monitoring control unit, a monitoring unit, an application determination unit, and a sound effect setting unit. The monitoring control unit is configured to, after the electronic equipment is turned on, enable a monitoring service. The monitoring unit is configured to monitor a newly created view in the electronic equipment by means of the monitoring service to determine whether there is the newly created view in the electronic equipment or not, a characteristic of the newly created view having a mapping relationship with an application in the electronic equipment. The application determination unit is configured to, if the monitoring unit determines that there is the newly created view in the electronic equipment, determine the application having the mapping relationship with the characteristic of the newly created view in the electronic equipment according to the mapping relationship. The sound effect setting unit is configured to acquire a scene sound effect corresponding to the application and set a current sound effect of the electronic equipment as the scene sound effect.

According to a third aspect, the embodiments of the disclosure provide electronic equipment, which includes a processor, a memory and an audio output device configured to output a scene sound effect. The processor may be configured to execute any method provided by the embodiments of the disclosure.

According to a fourth aspect, the embodiments of the disclosure provide a computer-readable storage medium for storing a computer program configured for electronic data exchange. The computer program may be executed to implement any method of the embodiments of the disclosure.

According to a fifth aspect, the embodiments of the disclosure provide a program product, which may be executed to implement any method of the embodiments of the disclosure.

From the above technical solutions, it can be seen that the embodiments of the disclosure have the following advantages. By monitoring of the newly created view in the electronic equipment, the mapping relationship between the newly created view and the application and a correspondence between a scene sound effect and an application, a current application scene of the electronic equipment is accurately determined and the required scene sound effect is accurately determined. This process avoids human intervention to setting of the scene sound effect. Therefore, on the premise of ensuring relatively higher accuracy of the scene sound effect, operations are simplified, and utilization efficiency of the electronic equipment is improved.

BRIEF DESCRIPTION OF DRAWINGS

In order to describe the technical solutions in the embodiments of the disclosure more clearly, the drawings required to be used in descriptions about the embodiments will be briefly introduced below.

DETAILED DESCRIPTION

In order to make the purpose, technical solutions and advantages of the disclosure, the disclosure will further be described below in combination with the drawings in detail. Apparently, the described embodiments are not all embodiments but part of embodiments of the disclosure. All other embodiments obtained by those of ordinary skilled in the art on the basis of the embodiments in the disclosure without creative work shall fall within the scope of protection of the disclosure.

Figure 1:
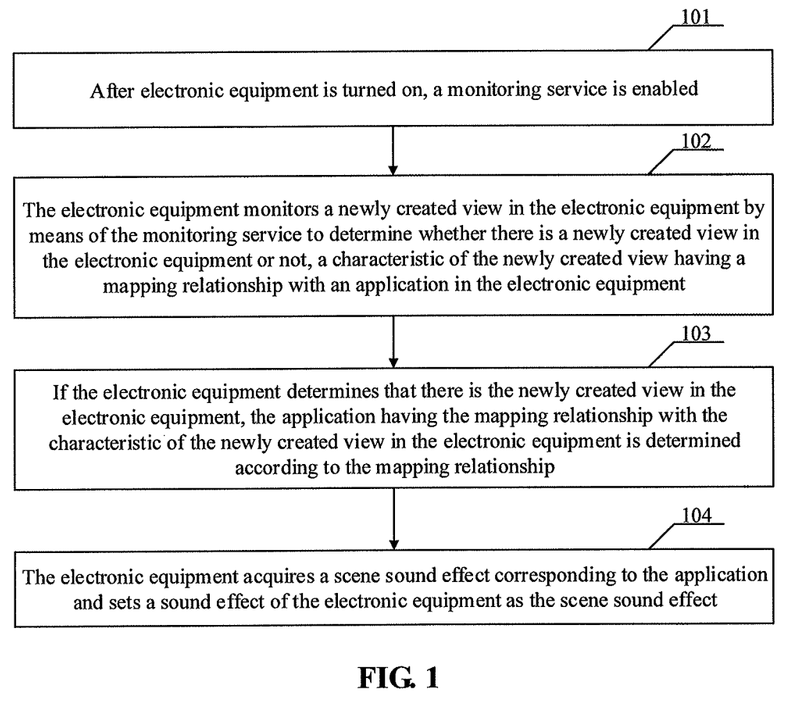
FIG. 1 is a flowchart of a method according to an embodiment of the disclosure.

An embodiment of the disclosure provides a method for controlling a scene sound effect. As shown in FIG. 1, the method includes the following operations.

In 101, after electronic equipment is turned on, a monitoring service is enabled.

In the embodiment, the monitoring service may be implemented by a hardware entity and may also be based on a software function of the hardware entity. There are no exclusive limits made in the embodiment of the disclosure.

In 102, the electronic equipment monitors a newly created view in the electronic equipment by means of the monitoring service to determine whether there is the newly created view in the electronic equipment or not, a characteristic of the newly created view having a mapping relationship with an application in the electronic equipment.

In the embodiment of the disclosure, a view is an image output to a display screen after being created in the electronic equipment. The view may be an image picture drawn by a main process and may also be an image picture drawn by a newly created thread. For a source of the view, there are no exclusive limits made in the embodiment of the disclosure. In addition, in the embodiment of the disclosure, when it is monitored that a new view is created, if there is audio output at the same time, the application scene is determined to be a video playing application and is correspondingly determined to be a video playing application scene.

The characteristic of the newly created view refers to an image characteristic of the view. For example, views of a video, a game and other application software may have differences from each other. More specifically, a video may be displayed in form of continuous image data with a fixed resolution and format, and a view is generated by decoding a data image; and a view of a game also usually has a fixed resolution, but its view format and generation manner may be different from a video image. By means of these characteristics of the views, the application corresponding to the newly created view may be determined.

The mapping relationship between the characteristic of the newly created view and the application may be a one-to-one correspondence. The application mentioned herein should be understood as a generalized application, for example, application software, a client of the application, a name of the application or a type of the application. This depends on content to which the scene sound effect is finally required to correspond. For example, if the scene sound effect corresponds to a type of applications, the application should be understood as the application type herein. If the scene sound effect accurately corresponds to certain application software, the application should be understood as the application software herein.

In 103, if the electronic equipment determines that there is the newly created view in the electronic equipment, the application having the mapping relationship with the characteristic of the newly created view in the electronic equipment is determined according to the mapping relationship.

For how specifically to monitor and determine whether a new view is created or not, there are no exclusive limits made in the embodiment of the disclosure. If the monitoring process recorded above is implemented by software service, the monitoring service may be enabled in an application layer to monitor a new view created by a thread or a process.

In 104, the electronic equipment acquires a scene sound effect corresponding to the application and sets a current sound effect of the electronic equipment as the scene sound effect.

After the scene sound effect is set, audio output equipment of the electronic equipment may be used, and the audio output equipment may include a sound card and an audio output interface or include the sound card and a loudspeaker. Here, the audio output interface may be connected to external equipment such as a loudspeaker or an earphone.

According to the embodiment of the disclosure, by monitoring of the newly created view in the electronic equipment, the mapping relationship between the newly created view and the application and a correspondence between a scene sound effect and an application, a current application scene of the electronic equipment is accurately determined and the required scene sound effect is accurately determined. This process avoids human intervention to setting of the scene sound effect. Therefore, on the premise of ensuring relatively higher accuracy of the scene sound effect, operations are simplified, and utilization efficiency of the electronic equipment is improved.

In the embodiment of the disclosure, it is unnecessary to set different scene sound effects for all applications so as to reduce complexity of the scene sound effects. Specifically, the characteristic of the newly created view having the mapping relationship with the application in the electronic equipment includes that the characteristic of the newly created view forms a mapping relationship with a client of the application in the electronic equipment.

In the embodiment of the disclosure, it is unnecessary to set different scene sound effects for all applications so as to reduce complexity of the scene sound effects. Specifically, the characteristic of the newly created view having the mapping relationship with the client of the application in the electronic equipment includes that the characteristic of the newly created view forms a mapping relationship with an application type of the client of the application in the electronic equipment.

According to the embodiment, application software is substantially classified, and different types of application software require different sound effects. For example, game software and music software require different sound effects, and a real-time strategy game and a casual game require different sound effects.

Since accuracy of the mapping relationship between the newly created view and the application has relatively significant influence on final selection of the scene sound effect, the embodiment of the disclosure further provides the following solution. Before the application having the mapping relationship with the characteristic of the newly created view in the electronic equipment is determined according to the mapping relationship, the method further includes that the electronic equipment establishes a communication connection with a server located at a network side and sends a query request to the server at the network side through the communication connection, the query request containing a name of the client or a name of the application, and classification information of the client or classification information about classifying clients by names of applications being stored in the server at the network side.

The operation that the application having the mapping relationship with the characteristic of the newly created view in the electronic equipment is determined according to the mapping relationship includes that:

the electronic equipment receives an application type returned by the server, the application type being determined by the server on the network side according to the classification information of the client or the classification information about classifying clients by names of applications.

The operation that the electronic equipment acquires the scene sound effect corresponding to the application includes that:

the electronic equipment acquires the scene sound effect corresponding to the application type.

In the embodiment, the application type is mapped with the scene sound effect, and a mapping relationship is stored in the server for convenient maintenance. The server may be a cloud server, and the mapping relationship may be maintained and updated by an operating company and may also be customized by a user. There are no exclusive limits made in the embodiment of the disclosure. The query request may be implemented by a socket. Two programs on a network implement data exchange through a bidirectional communication connection, and one end of the bidirectional communication connection is called a socket.

Furthermore, on the basis of a personalized requirement of the user, the embodiment of the disclosure provides the following solution. The electronic equipment updates the classification information of the client or classification information about classifying clients by names of applications, stored in the server at the network side, through the communication connection.

Optionally, the embodiment of the disclosure further provides a preferred implementation solution for monitoring the newly created view. Specifically, the operation that the electronic equipment monitors the newly created view in the electronic equipment by means of the monitoring service includes that the electronic equipment monitors creation of a surface view in the electronic equipment by means of the monitoring service.

In the embodiment of the disclosure, a surface view is a picture which may be redrawn in an independent thread which is newly created, while a view is a picture which must be updated in a main thread of a User Interface (UI). Therefore, the surface view may be monitored more comprehensively and rapidly.

Optionally, the application includes at least one of a music player, a video player or a game application and a type of the application forms a correspondence with the scene sound effect.

The operation that the electronic equipment acquires the scene sound effect corresponding to the application includes that the electronic equipment determines the scene sound effect corresponding to the type of the application according to the correspondence between the application type and the scene sound effect.

It should be understood that there are many application types and the examples listed above are not all application types. In addition, the above application types may further be subdivided. For example, the game application may further be subdivided into a real-time strategy game application, a casual game application or the like.

Figure 2:
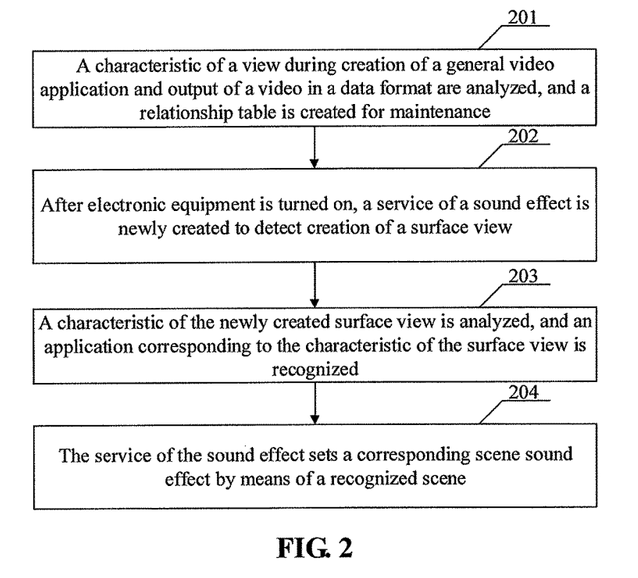
FIG. 2 is a flowchart of a method according to an embodiment of the disclosure.

As shown in FIG. 2, an embodiment of the disclosure further provides another more specific method flow example for description, including the following operations.

In 201, a general characteristic of a view during creation of a video application and output of a video in a data format are analyzed, and a relationship table is created for maintenance. A similar method may also be adopted for maintenance of another application such as a game.

In 202, after electronic equipment is turned on, a sound effect service is newly created to detect creation of a surface view.

In 203, a characteristic of the newly created surface view is analyzed, and is compared with the relationship table maintained above and related to the characteristic of the surface view to match and recognize whether an application corresponding to the characteristic of the surface view is a video, a game or another application scene.

In 204, the sound effect service sets a corresponding scene sound effect by means of the recognized scene.

The embodiment of the disclosure may be particularly applied to a video playing application scene. For example, every time when a video application is started, a view of a video may be created, and when the creation of the view of the video is monitored and an audio is output at the same time, it is determined that the video is currently played and then a scene sound effect corresponding to the video is adopted. If the audio is currently output but creation of the view of the video is not monitored, it is indicated that a non-video file is played and a scene sound effect corresponding to the non-video file is adopted.

Figure 3:
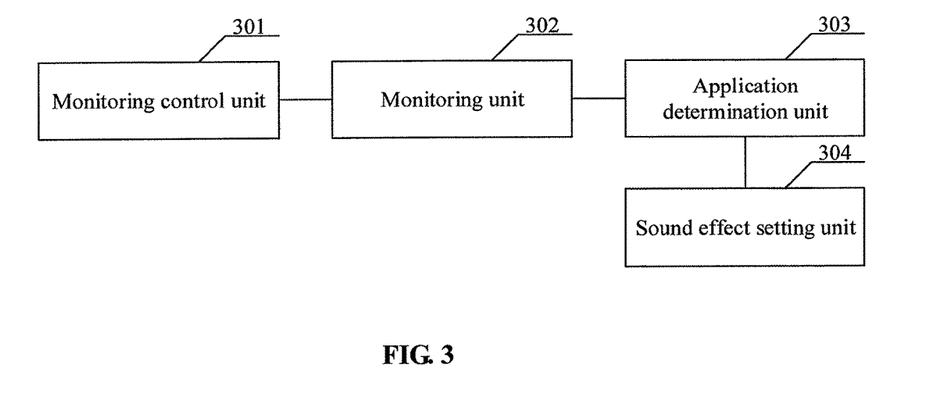
FIG. 3 is a structure diagram of electronic equipment according to an embodiment of the disclosure.

An embodiment of the disclosure further provides electronic equipment. As shown in FIG. 3, the electronic equipment includes a monitoring control unit 301, a monitoring unit 302, an application determination unit 303 and a sound effect setting unit 304.

The monitoring control unit 301 is configured to, after the electronic equipment is turned on, enable a monitoring service.

The monitoring unit 302, configured to monitor a newly created view in the electronic equipment by means of the monitoring service to determine whether there is the newly created view in the electronic equipment or not, a characteristic of the newly created view having a mapping relationship with an application in the electronic equipment.

The application determination unit 303 is configured to, if the monitoring unit 302 determines that there is the newly created view in the electronic equipment, determine the application having the mapping relationship with the characteristic of the newly created view in the electronic equipment according to the mapping relationship.

The sound effect setting unit 304 is configured to acquire a scene sound effect corresponding to the application and set a current sound effect of the electronic equipment as the scene sound effect.

In the embodiment, the monitoring service may be implemented by a hardware entity and may also be based on a software function of the hardware entity. There are no exclusive limits made in the embodiment of the disclosure.

In the embodiment of the disclosure, a view is an image output to a display screen after being created in the electronic equipment, and the view may be an image picture drawn by a main process and may also be an image picture drawn by a newly created thread. For a source of the view, there are no exclusive limits made in the embodiment of the disclosure.

The characteristic of the newly created view refers to an image characteristic of the view. For example, views of a video, a game and other application software may have differences from each other. More specifically, a video may be displayed in form of continuous image data with a fixed resolution and format, and a view is generated by decoding a data image. A view of a game also usually has a fixed resolution, but its view format and generation manner may be different from a video image. By means of these properties of the views, the application corresponding to the newly created view may be determined.

The mapping relationship between the characteristic of the newly created view and the application may be a one-to-one correspondence. The application mentioned herein should be understood as a generalized application, for example, application software, a client of the application, a name of the application or a type of the application. This depends on content to which the scene sound effect is finally required to correspond. For example, if the scene sound effect corresponds to a type of applications, the application should be understood as the application type herein. If the scene sound effect accurately corresponds to certain application software, the application should be understood as the application software herein.

For how specifically to monitor and determine whether a new view is created or not, there are no exclusive limits made in the embodiment of the disclosure. If the monitoring process recorded above is implemented by software service, the monitoring service may be enabled in an application layer to monitor a new view created by a thread or a process.

After the scene sound effect is set, audio output equipment of the electronic equipment may be used, and the audio output equipment may include a sound card and an audio output interface or include the sound card and a loudspeaker. Here, the audio output interface may be connected to external equipment such as a loudspeaker or an earphone.

According to the embodiment of the disclosure, by monitoring of the newly created view in the electronic equipment, the mapping relationship between the newly created view and the application and a correspondence between a scene sound effect and an application, a current application scene of the electronic equipment is accurately determined and the required scene sound effect is accurately determined. This process avoids human intervention to setting of the scene sound effect. Therefore, on the premise of ensuring relatively higher accuracy of the scene sound effect, operations are simplified, and utilization efficiency of the electronic equipment is improved.

In the embodiment of the disclosure, it is unnecessary to set different scene sound effects for all applications so as to reduce complexity of the scene sound effects. Specifically, the characteristic of the newly created view having the mapping relationship with the application in the electronic equipment includes that the characteristic of the newly created view forms a mapping relationship with a client of the application in the electronic equipment.

In the embodiment of the disclosure, it is unnecessary to set different scene sound effects for all applications so as to reduce complexity of the scene sound effects. Specifically, the characteristic of the newly created view having the mapping relationship with the client of the application in the electronic equipment includes that the characteristic of the newly created view forms a mapping relationship with an application type of the client of the application in the electronic equipment.

According to the embodiment, application software is substantially classified, and different types of application software require different sound effects. For example, game software and music software require different sound effects, and a real-time strategy game and a casual game require different sound effects.

Figure 4:
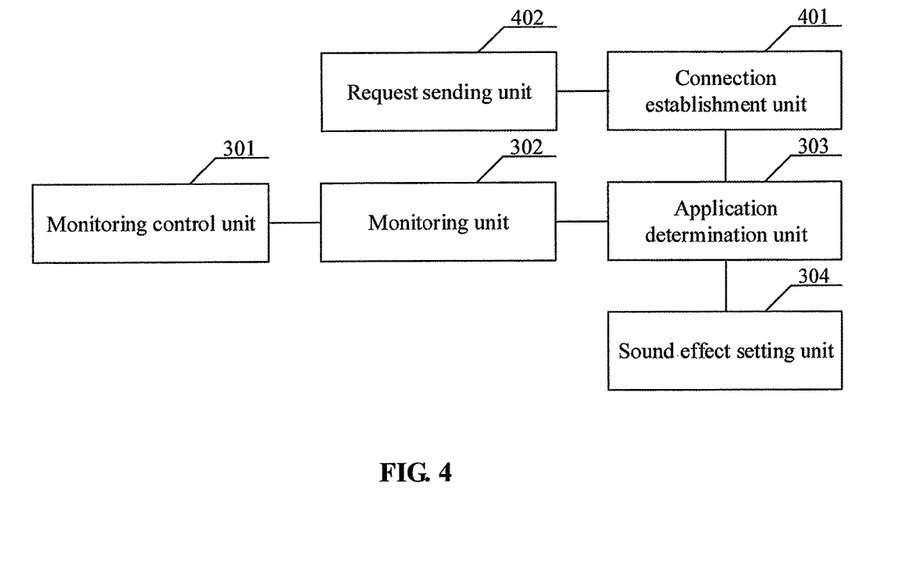
FIG. 4 is a structure diagram of electronic equipment according to an embodiment of the disclosure.

Since accuracy of the mapping relationship between the newly created view and the application has relatively significant influence on final selection of the scene sound effect, the embodiment of the disclosure further provides the following solution. As shown in FIG. 4, the electronic equipment further includes a connection establishment unit 401 and a request sending unit 402.

The connection establishment unit 401 is configured to, before the application determination unit 303 determines the application having the mapping relationship with the characteristic of the newly created view in the electronic equipment according to the mapping relationship, establish a communication connection with a server located at a network side.

The request sending unit 402 is configured to send a query request to the server at the network side through the communication connection, the query request containing a name of the client or a name of the application and classification information of the client or classification information about classifying clients by names of applications being stored in the server at the network side.

The application determination unit 303 is specifically configured to receive an application type returned by the server, the application type being determined by the server at the network side according to the classification information of the client or the classification information about classifying clients by names of applications.

The sound effect setting unit 304 is specifically configured to acquire the scene sound effect corresponding to the application type.

In the embodiment, the application type is mapped with the scene sound effect, and a mapping relationship is stored in the server for convenient maintenance. The server may be a cloud server. The mapping relationship may be maintained and updated by an operating company and may also be customized by a user. There are no exclusive limits made in the embodiment of the disclosure. The query request may be implemented by a socket. Two programs on a network implement data exchange through a bidirectional communication connection, and one end of the bidirectional communication connection is called a socket.

Figure 5:
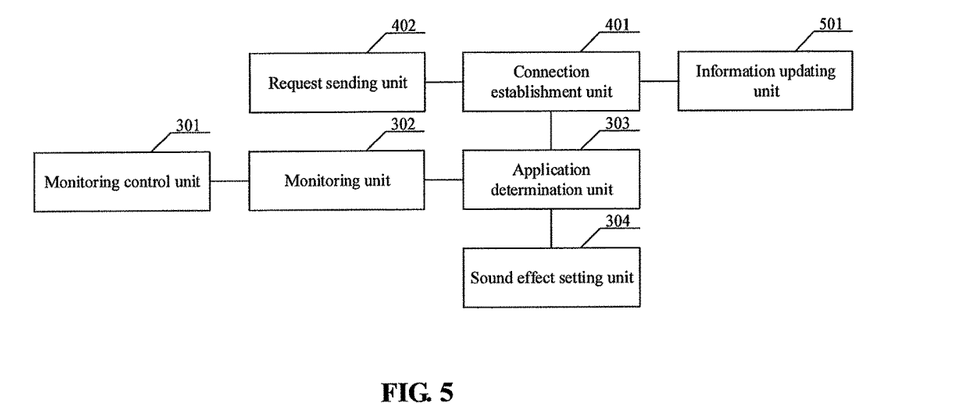
FIG. 5 is a structure diagram of electronic equipment according to an embodiment of the disclosure.

Furthermore, on the basis of a personalized requirement of the user, the embodiment of the disclosure provides the following solution. As shown in FIG. 5, the electronic equipment further includes an information updating unit 501, configured to update the classification information of the client or classification information about classifying clients by names of applications, stored in the server at the network side, through the communication connection.

Optionally, the embodiment of the disclosure further provides a preferred implementation solution for monitoring the newly created view. Specifically, the monitoring unit 302 is specifically configured to monitor creation of a surface view in the electronic equipment by means of the monitoring service.

In the embodiment of the disclosure, a surface view is a picture which may be redrawn in an independent thread which is newly created, while a view is a picture which must be updated in a main thread of a UI. Therefore, the surface view may be monitored more comprehensively and rapidly.

Optionally, the application includes at least one of a music player, a video player or a game application. A type of the application has a correspondence with the scene sound effect.

The sound effect setting unit 304 is specifically configured to determine the scene sound effect corresponding to the type of the application according to the correspondence between the application type and the scene sound effect.

It should be understood that there are many application types and the examples listed above are not all application types. In addition, the above application types may further be subdivided. For example, the game application may further be subdivided into a real-time strategy game application, a casual game application or the like.

Figure 6:
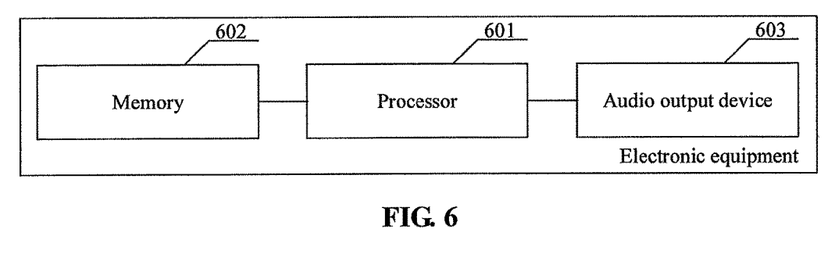
FIG. 6 is a structure diagram of electronic equipment according to an embodiment of the disclosure.

An embodiment of the disclosure further provides another electronic equipment, which, as shown in FIG. 6, includes: a processor 601, a memory 602 and audio output equipment 603 configured to output a scene sound effect. The memory 602 may be configured to provide a cache required by execution of data processing for the processor 601, and may further provide a storage space for audio data of the scene sound effect. The audio data of the scene sound effect may be from a network side, and the local memory 602 of the electronic equipment may provide a downloading buffer memory space.

The processor 601 is configured to, after the electronic equipment is turned on, enable a monitoring service, monitor a newly created view in the electronic equipment by means of the monitoring service to determine whether the newly created view exists in the electronic equipment or not, a characteristic of the newly created view having a mapping relationship with an application in the electronic equipment, if it is determined that the newly created view exists in the electronic equipment, determine the application having the mapping relationship with the characteristic of the newly created view in the electronic equipment according to the mapping relationship, acquire a scene sound effect corresponding to the application and set a current sound effect of the electronic equipment as the scene sound effect.

In the embodiment, the monitoring service may be implemented by a hardware entity and may also be based on a software function of the hardware entity. There are no exclusive limits made in the embodiment of the disclosure.

In the embodiment of the disclosure, a view is an image output to a display screen after being created in the electronic equipment, and the view may be an image picture drawn by a main process and may also be an image picture drawn by a newly created thread. For a source of the view, there are no exclusive limits made in the embodiment of the disclosure.

The characteristic of the newly created view refers to an image characteristic of the view. For example, views of a video, a game and other application software may have differences from each other. More specifically, a video may be displayed in form of continuous image data with a fixed resolution and format, and a view is generated by decoding a data image. A view of a game also usually has a fixed resolution, but its view format and generation manner may be different from a video image. By means of these characteristics of the view, the application corresponding to the newly created view may be determined.

The mapping relationship between the characteristic of the newly created view and the application may be a one-to-one correspondence. The application mentioned herein should be understood as a generalized application, for example, application software, a client of the application, a name of the application or a type of the application. This depends on content to which the scene sound effect is finally required to correspond. For example, if the scene sound effect corresponds to a type of applications, the application should be understood as the application type herein. If the scene sound effect accurately corresponds to certain application software, the application should be understood as the application software herein.

For how specifically to monitor and determine whether a new view is created or not, there are no exclusive limits made in the embodiment of the disclosure. If the monitoring process recorded above is implemented by software service, the monitoring service may be enabled in an application layer to monitor a new view created by a thread or a process.

After the scene sound effect is set, an audio output device of the electronic equipment may be used, and the audio output device may include a sound card and an audio output interface or include the sound card and a loudspeaker. Here, the audio output interface may be connected to external equipment such as a loudspeaker or an earphone.

According to the embodiment of the disclosure, by monitoring of the newly created view in the electronic equipment, the mapping relationship between the newly created view and the application and a correspondence between a scene sound effect and an application, a current application scene of the electronic equipment is accurately determined and the required scene sound effect is accurately determined. This process avoids human intervention to setting of the scene sound effect. Therefore, on the premise of ensuring relatively higher accuracy of the scene sound effect, operations are simplified, and utilization efficiency of the electronic equipment is improved.

In the embodiment of the disclosure, it is unnecessary to set different scene sound effects for all applications so as to reduce complexity of the scene sound effects. Specifically, the characteristic of the newly created view having the mapping relationship with the application in the electronic equipment includes that the characteristic of the newly created view forms a mapping relationship with a client of the application in the electronic equipment.

In the embodiment of the disclosure, it is unnecessary to set different scene sound effects for all applications so as to reduce complexity of the scene sound effects. Specifically, the characteristic of the newly created view having the mapping relationship with the client of the application in the electronic equipment includes that the characteristic of the newly created view forms a mapping relationship with an application type of the client of the application in the electronic equipment.

According to the embodiment, application software is substantially classified, and different types of application software require different sound effects. For example, game software and music software require different sound effects, and a real-time strategy game and a casual game require different sound effects.

Since accuracy of the mapping relationship between the newly created view and the application has relatively significant influence on final selection of the scene sound effect, the embodiment of the disclosure further provides the following solution. As shown in FIG. 4, the processor 601 is further configured to, before determining the application having the mapping relationship with the characteristic of the newly created view in the electronic equipment according to the mapping relationship, establish a communication connection with a server located on a network side and send a query request to the server on the network side through the communication connection, the query request containing a name of the client or a name of the application and classification information of the client or classification information about classifying clients by names of applications being stored in the server at the network side.

The processor 601 is configured to determine the application having the mapping relationship with the characteristic of the newly created view in the electronic equipment according to the mapping relationship, which includes that the processor 601 is configured to receive an application type returned by the server, the application type being determined by the server on the network side according to the classification information of the client or the classification information about classifying clients by names of applications.

The processor 601 is configured to acquire the scene sound effect corresponding to the application, which includes that the processor 601 is configured to acquire the scene sound effect corresponding to the application type.

In the embodiment, the application type is mapped with the scene sound effect, and a mapping relationship is stored in the server for convenient maintenance. The server may be a cloud server. The mapping relationship may be maintained and updated by an operating company and may also be customized by a user. There are no exclusive limits made in the embodiment of the disclosure. The query request may be implemented by a socket. Two programs on a network implement data exchange through a bidirectional communication connection, and one end of the bidirectional communication connection is called as a socket.

Optionally, the embodiment of the disclosure further provides a preferred implementation solution for monitoring the newly created view. Specifically, the processor 601 is configured to monitor the newly created view in the electronic equipment by means of the monitoring service, which includes: monitoring creation of a surface view in the electronic equipment by means of the monitoring service.

In the embodiment of the disclosure, a surface view is a picture which may be redrawn in an independent thread which is newly created, while a view is a picture which must be updated in a main thread of a UI. Therefore, the surface view may be monitored more comprehensively and rapidly.

Optionally, the application includes at least one of a music player, a video player or a game application. A type of the application e forms a correspondence with the scene sound effect.

The processor 601 is configured to determine the scene sound effect corresponding to the type of the application according to the correspondence between the application type and the scene sound effect.

It should be understood that there are many application types and the examples listed above are not all application types. In addition, the above application types may further be subdivided. For example, the game application may further be subdivided into a real-time strategy game application, a casual game application or the like.

Figure 7:
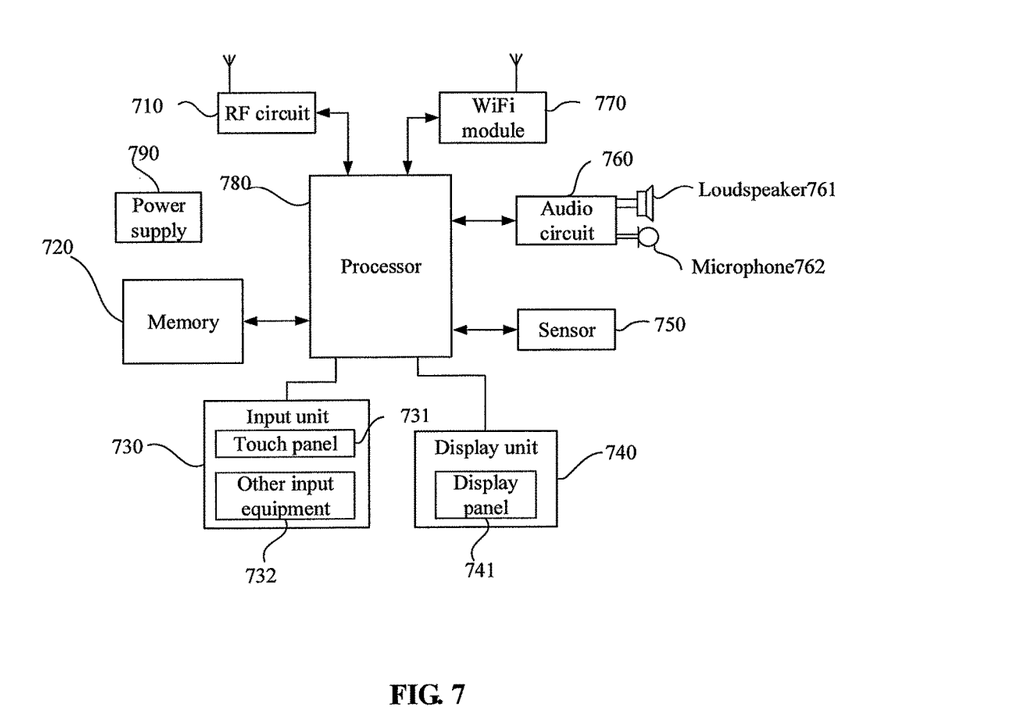
FIG. 7 is a structure diagram of terminal equipment according to an embodiment of the disclosure.

An embodiment of the disclosure further provides terminal equipment. As shown in FIG. 7, for convenient description, only parts related to the embodiment of the disclosure are shown, and specific technical details which are undisclosed refer to parts of the method of the embodiments of the disclosure. The terminal equipment may be any terminal equipment including a mobile phone, a tablet computer, a Personal Digital Assistant (PDA), a Point of Sales (POS), a vehicle-mounted computer or the like. For example, the terminal equipment is a mobile phone.

FIG. 7 is a block diagram of part of a structure of a mobile phone related to terminal equipment according to an embodiment of the disclosure. Referring to FIG. 7, the mobile phone includes components such as a Radio Frequency (RF) circuit 710, a memory 720, an input unit 730, a display unit 740, a sensor 750, an audio circuit 760, a Wireless Fidelity (WiFi) module 770, a processor 780 and a power supply 790. Those skilled in the art should know that the structure of the mobile phone shown in FIG. 7 is not intended to limit the mobile phone and may include components more or fewer than those shown in the figure or some components are combined or different component arrangements are adopted.

Each component of the mobile phone will be specifically introduced below in combination with FIG. 7.

The RF circuit 710 may be configured to receive and send signals in an information receiving and sending or communication process, particularly after receiving downlink information of a base station, send it to the processor 780 for processing and, in addition, send designed uplink data to the base station. The RF circuit 710 usually includes, but not limited to, an antenna, at least one amplifier, a transceiver, a coupler, a Low Noise Amplifier (LNA), a duplexer or the like. In addition, the RF circuit 710 may also communicate with a network and other equipment in a wireless communication manner. Any communication standard or protocol may be used for wireless communication, including, but not limited to, a Global System of Mobile communication (GSM), General Packet Radio Service (GPRS), Code Division Multiple Access (CDMA), Wideband Code Division Multiple Access (WCDMA), Long Term Evolution (LTE), an electronic mail, Short Messaging Service (SMS) or the like.

The memory 720 may be configured to store a software program and a module, and the processor 780 operates the software program and module stored in the memory 720, thereby executing various function applications and data processing of the mobile phone. The memory 720 may mainly include a program storage region and a data storage region, wherein the program storage region may store an operating system, an application program required by at least one function (for example, a sound playing function and an image playing function) or the like, and the data storage region may store data (for example, audio data and a phonebook) created according to use of the mobile phone or the like. In addition, the memory 720 may include a high-speed random access memory, and may further include a non-volatile memory, for example, at least one disk storage device, flash memory device or other volatile solid-state storage device.

The input unit 730 may be configured to receive input digital or character information and generate key signal input related to user setting and function control of the mobile phone. Specifically, the input unit 730 may include a touch panel 731 and other input equipment 732. The touch panel 731, also called as a touch screen, may collect a touch operation (for example, operation executed by a user with any proper object or accessory such as a finger and a stylus on the touch panel 731 or nearby the touch panel 731) of the user thereon or nearby and drive a corresponding connection device according to a preset program. Optionally, the touch panel 731 may include two parts, i.e., a touch detection device and a touch controller, wherein the touch detection device detects a touch orientation of the user, detects a signal generated by a touch operation and sends the signal to the touch controller; and the touch controller receives touch information from the touch detection device and converts it into a contact coordinate for sending to the processor 780, and may receive and execute a command sent by the processor 780. In addition, the touch panel 731 may be implemented into multiple types such as a resistance type, a capacitance type, an infrared type and a surface acoustic wave type. Besides the touch panel 731, the input unit 730 may further include the other input equipment 732. Specifically, the other input equipment 732 may include, but not limited to, one or more of a physical keyboard, a function key (for example, a volume control key and an on-off key), a trackball, a mouse, a joystick or the like.

The display unit 740 may be configured to display information input by the user or information provided for the user and various menus of the mobile phone. The display unit 740 may include a display panel. Optionally, the display panel 741 may be configured in form of a Liquid Crystal Display (LCD), an Organic Light-Emitting Diode (OLED) or the like. Furthermore, the touch panel 731 may cover the display panel 741, the touch panel 731, after detecting the touch operation executed thereon or nearby, transmits it to the processor 780 to determine a type of a touch event, and the processor 780 subsequently provides corresponding visual output on the display panel 741 according to the type of the touch event. Although the touch panel 731 and display panel 741 in FIG. 7 realize input and output functions of the mobile phone as two independent components, the touch panel 731 and the display panel 741 may be integrated to realize the input and output functions of the mobile phone in some embodiments.

The mobile phone may further include at least one sensor 750, for example, a light sensor, a motion sensor and another sensor. Specifically, the light sensor may include an environmental light sensor and a proximity sensor, wherein the environmental light sensor may regulate brightness of the display panel 741 according to brightness of environmental light, and the proximity sensor may turn off the display panel 741 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application recognizing a posture of the mobile phone (for example, landscape and portrait switching, a related game and magnetometer posture calibration), a vibration recognition related function or the like (for example, a pedometer and knocking). Other sensors, for example, a gyroscope, a barometer, a hygrometer, a thermometer and an infrared sensor, which may be configured in the mobile phone will not be elaborated herein.

The audio circuit 760, a loudspeaker 761 and a microphone 762 may provide an audio interface between the user and the mobile phone. The audio circuit 760 may transmit an electric signal converted from received audio data to the loudspeaker 761, and then the loudspeaker 761 converts it into a sound signal for output. On the other aspect, the microphone 762 converts a collected sound signal into an electric signal, and then the audio circuit 760 receives and converts it into audio data and outputs the audio data to the processor 780 for processing and sending to, for example, another mobile phone through the RF circuit 710 or outputs the audio data to the memory 720 for further processing.

WiFi is a short-distance wireless communication technology. The mobile phone may help the user to receive and send an electronic mail, browse a webpage, access streaming media or the like through the WiFi module 770, and provides wireless broadband Internet access for the user. Although the WiFi module 770 is shown in FIG. 7, it can be understood that it is not a necessary component of the mobile phone and may completely be omitted according to a requirement without changing the scope of the essence of the disclosure.

The processor 780 is a control center of the mobile phone, connects each part of the whole mobile phone by virtue of various interfaces and lines and executes various functions and data processing of the mobile phone by operating or executing the software program and/or module stored in the memory 720 and calling data stored in the memory 720, thereby monitoring the whole mobile phone. Optionally, the processor 780 may include one or more processing units. Preferably, the processor 780 may integrate an application processor and a modulation and demodulation processor, wherein the application processor mainly processes the operating system, a UI, an application program or the like, and the modulation and demodulation processor mainly processes wireless communication. It can be understood that the modulation and demodulation processor may also not be integrated into the processor 780.

The mobile phone further includes a power supply 790 (for example, a battery) supplying power to each component. Preferably, the power supply may be logically connected with the processor 780 through a power management system, thereby realizing functions of charging and discharging management, power consumption management or the like through the power management system.

Although not shown in the figure, the mobile phone may further include a camera, a Bluetooth module or the like, which will not be elaborated herein.

In the embodiment of the disclosure, the processor 780 of the terminal equipment further has functions corresponding to the processor 601 in the abovementioned embodiment.

It is noted that, in the embodiment of the electronic equipment, each included unit is only divided according to function logic but is not limited to abovementioned division as long as the corresponding function may be realized. In addition, a specific name of each functional unit is only for convenient distinction and not intended to limit the scope of protection of the disclosure.

In addition, those of ordinary skilled in the art can understand that implementation of all or part of the steps in each method embodiment may be completed by related hardware instructed by a program, the corresponding program may be stored in a computer-readable storage medium, and the abovementioned storage medium may be a read-only memory, a magnetic disk, an optical disk or the like.

The invention claimed is:
1. A method for controlling a scene sound effect, comprising:
   determining whether there is a view in electronic equipment,
   in the case that the electronic equipment determines that there is the view, determining a type of an application having a mapping relationship with a characteristic of the view according to the mapping relationship between characteristics of views and types of applications in the electronic equipment;
   acquiring, by the electronic equipment, a scene sound effect corresponding to the application;
   and setting a sound effect of the electronic equipment as the scene sound effect.
2. The method according to claim 1, before determining the type of the application having the mapping relationship with the characteristic of the view according to the mapping relationship, further comprising:
   establishing, by the electronic equipment, a communication connection with a server located at a network side and sending a query request to the server at the network side through the communication connection, the query request comprising a name of the client or a name of the application, and classification information of the client or classification information about classifying clients by names of applications being stored in the server at the network side, wherein determining the type of the application having the mapping relationship with the characteristic of the view according to the mapping relationship comprises:

receiving, by the electronic equipment, a type an application returned by the server, the type of the application being determined by the server at the network side according to the classification information of the client or the classification information about classifying clients by names of applications; and wherein acquiring, by the electronic equipment, the scene sound effect corresponding to the application comprises:

acquiring, by the electronic equipment, the scene sound effect corresponding to the type of the application.

3. The method according to claim 2, wherein sending the query request to the server at the network side through the communication connection comprises:

sending the query request to the server at the network side by means of a socket through the communication connection.

4. The method according to claim 1, further comprising: monitoring, by a monitoring service, creation of a surface view in the electronic equipment.

5. The method according to claim 1, wherein the application comprises at least one of a music player, a video player or a game application; and a type of the application has a correspondence with the scene sound effect; and wherein acquiring, by the electronic equipment, the scene sound effect corresponding to the application comprises:

determining, by the electronic equipment, the scene sound effect corresponding to the type of the application according to the correspondence between the type of the application and the scene sound effect.

6. The method according to claim 1, wherein the view comprises: an image output to a display screen after being created in the electronic equipment, and the view is an image drawn by a main process or an image drawn by a thread.

7. The method according to claim 1, further comprising: monitoring, by a monitoring service enabled in an application layer, a view newly created by a thread or a process.

8. The method according to claim 1, wherein the view is newly created.

9. Electronic equipment, comprising:

a processor;

a memory for storing instructions executable by the processor;

wherein the processor is configured to execute the instructions to determine whether there is a view;

in the case that it is determined that there is the view determine a type of an application having a mapping relationship with a characteristic of the view according to the mapping relationship between characteristics of views and types of applications in the electronic equipment;

acquire a scene sound effect corresponding to the application;

and set a sound effect of the electronic equipment as the scene sound effect.

10. The electronic equipment according to claim 9, wherein the processor is further configured to:

before determining the type of the application having the mapping relationship with the characteristic of the view according to the mapping relationship, establish a communication connection with a server located at a network side; and send a query request to the server at the network side through the communication connection, the query request comprising a name of the client or a name of the application, and classification information of the client or classification information about classifying clients by names of applications being stored in the server at the network side, and wherein the processor is specifically configured to receive a type of an application returned by the server, the type of the application being determined by the server at the network side according to the classification information of the client or the classification information about classifying clients by names of applications; and acquire the scene sound effect corresponding to the type of the application.

11. The electronic equipment according to claim 10, wherein the processor is further configured to sending the query request to the server at the network side by means of a socket through the communication connection.

12. The electronic equipment according to claim 9, wherein the processor is configured to monitor creation of a surface view in the electronic equipment.

13. The electronic equipment according to claim 9, wherein the application comprises at least one of a music player, a video player or a game application; and a type of the application has a correspondence with the scene sound effect; and wherein the processor is configured to determine the scene sound effect corresponding to the type of the application according to the correspondence between the type of the application type and the scene sound effect.

14. The electronic equipment according to claim 9, wherein the view comprises: an image output to a display screen after being created in the electronic equipment, and the view is an image drawn by a main process or an image drawn by a thread.

15. The electronic equipment according to claim 9, wherein the processor is further configured to monitor a view newly created by a thread or a process by means of the monitoring service enabled in an application layer.

16. The electronic equipment according to claim 9, further comprising: an audio output device configured to output a scene sound effect.

17. The electronic equipment according to claim 9, wherein the view is newly created.

18. A non-transitory computer-readable storage medium for storing a computer program configured for controlling a scene sound effect, wherein the computer program is executed to implement operations of:

determining whether there is a view in electronic equipment;

in the case that the electronic equipment determines that there is the view, determining a type of an application having a mapping relationship with a characteristic of the view according to the mapping relationship between characteristics of views and types of applications in the electronic equipment;

acquiring, by the electronic equipment, a scene sound effect corresponding to the application; and setting a sound effect of the electronic equipment as the scene sound effect.

* * * * *